(12) United States Patent
Edwards et al.

(10) Patent No.: US 12,445,447 B2
(45) Date of Patent: Oct. 14, 2025

(54) SYSTEMS AND METHODS FOR VALIDATING NETWORK OPERATIONS BETWEEN USER ACCOUNTS THROUGH ACCESS TOKENS

(71) Applicant: Capital One Services, LLC, McLean, VA (US)

(72) Inventors: Joshua Edwards, Philadelphia, PA (US); Om Prakash Tripathi, Glen Allen, VA (US); Jesse Emery, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 322 days.

(21) Appl. No.: 18/056,690

(22) Filed: Nov. 17, 2022

(65) Prior Publication Data
US 2024/0171582 A1   May 23, 2024

(51) Int. Cl.
*H04L 9/40* (2022.01)
*H04L 41/16* (2022.01)

(52) U.S. Cl.
CPC ............ *H04L 63/102* (2013.01); *H04L 41/16* (2013.01); *H04L 63/0876* (2013.01)

(58) Field of Classification Search
CPC .... H04L 63/102; H04L 41/16; H04L 63/0876
See application file for complete search history.

(56) References Cited

U.S. PATENT DOCUMENTS

| | | | |
|---|---|---|---|
| 9,071,618 B1* | 6/2015 | Pruthi | H04L 63/105 |
| 12,045,821 B1* | 7/2024 | Bhattacharyya | G06Q 20/065 |
| 2012/0317028 A1* | 12/2012 | Ansari | G06Q 20/28 |
| | | | 705/44 |
| 2014/0173693 A1* | 6/2014 | Bikkula | H04L 63/0815 |
| | | | 726/4 |
| 2020/0111102 A1* | 4/2020 | Vukich | G06Q 20/40145 |
| 2021/0027291 A1* | 1/2021 | Ranganathan | H04L 63/102 |
| 2021/0126789 A1* | 4/2021 | Chang | H04L 67/306 |
| 2021/0241304 A1* | 8/2021 | Benkreira | G06Q 30/0215 |
| 2022/0405580 A1* | 12/2022 | Zheng | G06F 18/24147 |
| 2023/0230065 A1* | 7/2023 | Yan | G06Q 20/36 |
| | | | 705/41 |
| 2023/0281606 A1* | 9/2023 | Jakobsson | G06Q 20/3674 |
| | | | 705/67 |
| 2023/0396615 A1* | 12/2023 | Lin | H04L 63/20 |
| 2024/0029065 A1* | 1/2024 | Dey | G06Q 20/3674 |
| 2024/0249254 A1* | 7/2024 | Manoharan | G06Q 20/386 |

\* cited by examiner

*Primary Examiner* — Philip J Chea
*Assistant Examiner* — Ghizlane Maazouz
(74) *Attorney, Agent, or Firm* — Foley & Lardner LLP

(57) ABSTRACT

Methods and systems are described herein for moving access tokens for validating network operations between user accounts to prevent malicious or nonaligned usage. The system may determine that a user is associated with a first user account and a second user account, retrieve parameters associated with the first and second user accounts, determine that an access token is available for migration, update a binding associated with the access token from the first to the second user account, and, in response to receiving a network operation request, may process the request using the second user account.

20 Claims, 6 Drawing Sheets

Account 1
202

| Parameters 204 | |
|---|---|
| Account # | x7320 |
| User ID | 2342165 |
| Expir. Date | 08/13/2028 |
| Interchange Rate | 2.00% |
| Account Type | Rewards |
| Account Age | 10 months |

| Token Bindings 206 | | |
|---|---|---|
| Token No. | CVV | Token Exp. |
| x3623 | 342 | 01/13/2026 |
| x3452 | 742 | 02/22/2025 |
| x5221 | 012 | 08/30/2025 |

Account 1 Transfer Rules 208

| Parameter | Cond. | Value |
|---|---|---|
| User ID | == | 2342165 |
| Expir. Date | < | 09/13/2026 |
| Inter. Rate | > | 1.5% |
| Acc. Type | == | Rewards |
| Acc. Age | >= | 24 months |

Account 2
212

| Parameters 214 | |
|---|---|
| Account # | x3421 |
| User ID | 2342165 |
| Expir. Date | 08/13/2035 |
| Interchange Rate | 2.00% |
| Account Type | Rewards |
| Account Age | 10 months |

| Token Bindings 216 | | |
|---|---|---|
| Token No. | CVV | Token Exp. |
| x6432 | 512 | 01/13/2029 |
| x1934 | 883 | 02/22/2032 |

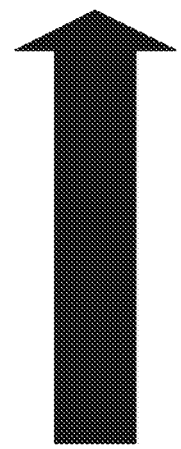

FIG. 2

SYSTEMS AND METHODS FOR VALIDATING NETWORK OPERATIONS BETWEEN USER ACCOUNTS THROUGH ACCESS TOKENS

BACKGROUND

As users increasingly interact through an online world, the number of user accounts associated with users has increased dramatically. A single user may possess multiple accounts across different platforms. Users may also possess various sub-accounts or secondary accounts related to or otherwise associated with a primary account. For example, various secondary accounts within a communication platform account may contain user profiles, data or configurations that are suitable for different projects, teams or organizations. However, conventionally, these secondary accounts are difficult to transfer between primary accounts while saving settings or configurations when, for example, a user desires to migrate a secondary account from one primary account to a newly created primary account on the same platform. In many instances secondary accounts may be represented using access tokens, which may be used for security and/or user authentication. Those access tokens may not be easily portable between primary accounts if, for example, account types are different. When transferring between two primary accounts, access tokens may not be compatible with different types of primary accounts, and it is currently difficult to determine whether an access token may be compatible with a new primary account without additional contextual information. Thus, without a context or set of criteria, it is difficult to determine whether migration of an access token from one primary account to another primary account may be possible.

SUMMARY

Methods and systems are described herein for migrating access tokens that are used for validating network operations between user accounts (e.g., primary accounts). The system may enable a user to determine whether an access token may be allowed to move from one account to another by retrieving rules that govern whether an access token migration is acceptable. The system may then compare the old and new accounts to determine whether they are compatible with the migration. For example, the system may retrieve parameters associated with the original user account, such as a user identifier, an account age, an account expiration date, an account type, and/or other suitable parameters, and determine whether the new user account has similar or compatible parameters. By retrieving a specific ruleset that is dependent on the first user account, the system may enable certain account migrations, but not others, depending on the circumstances, such as a match in parameters. By doing so, the system may provide control over whether an access token may migrate from one account to another, which enables the administrators of the user accounts to improve user experience by supporting a seamless transition in access tokens between accounts. Users may not need to update access tokens each time they would like to switch accounts, which has the additional benefit of encouraging users to continue creating secondary accounts and utilizing the given platform. More importantly, by controlling and validating when an access token may be migrated between accounts, the administrator may ensure the security and safety of the user accounts by preventing misuse or nonaligned usage of access tokens, thereby protecting access to the potentially sensitive information housed in the respective user accounts.

The system may achieve this benefit by determining that a user may have multiple accounts. That is, the system may determine that a user is associated with a first user account and a second user account. The first user account may be associated with multiple access tokens that have multiple parameters. The system may make this determination by, for example, providing a user identifier and checking whether multiple user accounts are associated with this identifier. For example, a user may wish to migrate a sub-account or a secondary account from one primary user account due to malicious content found in relation with the first account and, as a result, may cause the system to generate another primary user account. Each user account may have various associated access tokens, such as tokens corresponding to different devices or different sub-accounts used by the user in order to validate the user's identity. Each access token may include, for example, a logon security identifier (e.g., a logon SID) that may identify logon sessions, and may take advantage of an authorization protocol, such as Open Authorization. By identifying a user that may have multiple accounts, where one of the accounts has one or more access tokens, the system may identify instances where an access token may be eligible for transfer from one account to another.

In some embodiments, the system may automatically detect the creation of a second user account associated with the user. That is, the system may detect a creation of the second user account corresponding to the user and, in response to detecting the creation of the second user account, the system may determine whether to migrate one or more access tokens from the first user account to the second user account. For example, a user may create a second profile on a messaging platform for work-related messages (as opposed to personal messages). The system may automatically detect the creation of the work messaging account and may automatically determine whether the access token migration would be allowed or not and whether to carry out the change in access token bindings.

The system may retrieve parameters associated with the user accounts. That is, the system may retrieve multiple parameters associated with the first user account and multiple parameters associated with the second user account. For example, the system may retrieve an account identifier (such as an account number), an expiry date, and/or other suitable parameters. The parameters may include information about the creation of the account, such as when and by whom it was created, as well as the type, capabilities/features, and the amount of data contained within the account. The parametric information relating to the account may already be accessible to the system, or the system may query another server/system for the relevant parameters. In some embodiments, the system may retrieve parameters associated with the access tokens from a user account directly. That is, one or more parameters of the corresponding plurality of parameters may be inherited from the first user account. For example, for an access token that is bound to a particular user account, the system may retrieve parameters, such as usernames, account types, account creation dates and account statuses, associated with the access token directly from the user account of the binding. By collecting this information about both user accounts, the system gathers information that may be material to the question of whether an access token may be migrated from one of the accounts to another.

The system may determine that an access token may be available for migration from the first user account to the second user account. That is, based on the first account's parameters matching the second account's parameters, the system may determine that a first access token from the plurality of access tokens is available for migration from the first user account to the second user account. For example, the system may only allow a migration if the first user account and the second user account are of the same type. A user may have an initial user account on an office messaging platform, but a migration of access tokens from this messaging account to another account in a social media platform may not be allowable by the system. The system may accomplish this by determining direct matches between the various account parameters or may create a similarity metric depending on relative similarity between the various fields or parameters.

In some embodiments, the system may retrieve transfer rules, and compare the accounts' parameters to validate whether they are compliant with the transfer rules. For example, the system may retrieve an expiration date parameter associated with the first user account and, based on determining that the expiration date parameter is not within a threshold time period, the system may disable an option to migrate the first access token. For example, the system may allow a migration of the access token if the original account is close to expiring, in order to reduce the risk of security breaches on the first account. In some embodiments, the transfer rules may state that a migration of access tokens is only allowed if the age of the new account is above or below a certain threshold age. Upon making this determination, the system may confirm that the associated access token may be successfully moved to the second account without detriment to the user or administrator of the accounts.

In some embodiments, the system may determine matches based on the interchange rates associated with the different accounts. That is, determining whether the first plurality of parameters matches the second plurality of parameters may include retrieving an interchange parameter, validating the interchange parameter against the transfer rules, and, in response to this validation, determining that the first plurality of parameters matches the second plurality of parameters. For example, the system may determine that an interchange parameter associated with a first user account is higher than an interchange parameter associated with a second user account. In this case, the system may determine that a migration of an access token from one to another may not be consistent with the first account's transfer rules and, in response, may determine that a migration is not possible. Conversely, the interchange parameter for the second account may compare favorably to the interchange parameter for the first account (e.g., it is actually higher than that for the first account), in which case the system may determine that the sets of parameters match and that a migration is allowed.

In some embodiments, the system may carry out this determination through a machine learning model. That is, the system may input the first plurality of parameters, the second plurality of parameters, and metadata associated with the first user account into a machine learning model trained to determine whether to migrate access tokens between two user accounts and receive from the machine learning model a determination whether to migrate the first access token from the first user account to the second user account. For example, a machine learning model may be trained on data that includes parameters relating to models that were involved in previous migration processes, as well as relevant outcomes (e.g., the incidence of security breaches after migration in either the original account or the new account). By training the machine learning model based on this past data, the machine learning model may make a determination as to whether a migration between two accounts may lead to a beneficial outcome or not. The machine learning model used may be, for example, a feedforward artificial neural network (ANN) that may be trained using, for example, backpropagation. By doing so, the system may dynamically learn from migration processes and improve future suggestions.

The system may update a binding associated with the access token accordingly. That is, the system may update a binding associated with the first access token from the first user account to the second user account. For example, the system may, having determined that the access token is available for migration, modify a binding parameter that is associated with the token such that it refers to the second user account from the first user account. The binding could be changed by either, for example, destroying the access token and creating a new one with the same parameters. In some embodiments, this process may be carried out by modifying a field within the data structure of the token. The binding may also be modified on the user account side, where a user account parameter associated with the access token may be destroyed in the first account and created in the second account. The binding itself could be a pointer to the access token, or any other sort of identifier of the access token. Similarly, the token itself may include a pointer or identifier of the user account associated with it, which may be modifiable. By doing so, the system may complete the migration of the access token from one account to another, and the access token is then associated with the second user account rather than the first.

The system may process network operation requests using the second user account. That is, in response to receiving a network operation request associated with the first access token, the system may process the network operation request using the second user account. Rather than completing the request through the first user account, the system may complete the request through the second user account instead, having updated the access token's binding from the first to the second user account. For example, the access token itself may include a binding towards the new account, such that if a user were to utilize the access token, access would be granted to the second user account rather than the first. In some embodiments, usage of the access token may prompt the system to search and locate a user account with a binding identifying or pointing to the access token, and a network operation may be carried out only by that second user account. A network operation request may include a request to, for example, access the contents of the user account, which may be stored on an external server. A network operation request could also refer to sending or receiving a message or any other transaction. Thus, the system may operate as though the access token is associated with the second account, demonstrating that the access token has modified its original binding to the first account.

In some embodiments, the system may transmit a command to display a series of options for user accounts that may be associable with an access token, and enable a user device to make a selection. That is, the system may transmit, to a user device, a command to display a plurality of options. The command may include a plurality of indications for the plurality of access tokens. The plurality of options may enable the user to select the first access token to migrate to the second account. In response to receiving, from the first user device, a selection of an option associated with the first access token, the system may update the binding associated for the first access token. For example, a user device may generate for display a series of tokens, with a list of user accounts that it may be moved to. The user interface on the user device may enable a user to select another account to which to migrate the access token, but may disallow certain account bindings visually. By doing so, the system may give a user device control over an access token's account bindings, enabling seamless transitions of access tokens between accounts in situations where transfer rules may allow for such transitions. Where security problems or other issues may harm the user or the system, a migration may be pre-empted or blocked, which enables control over this migration.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates exemplary data structures holding parameters and token bindings for user accounts, as well as transfer rules between accounts, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
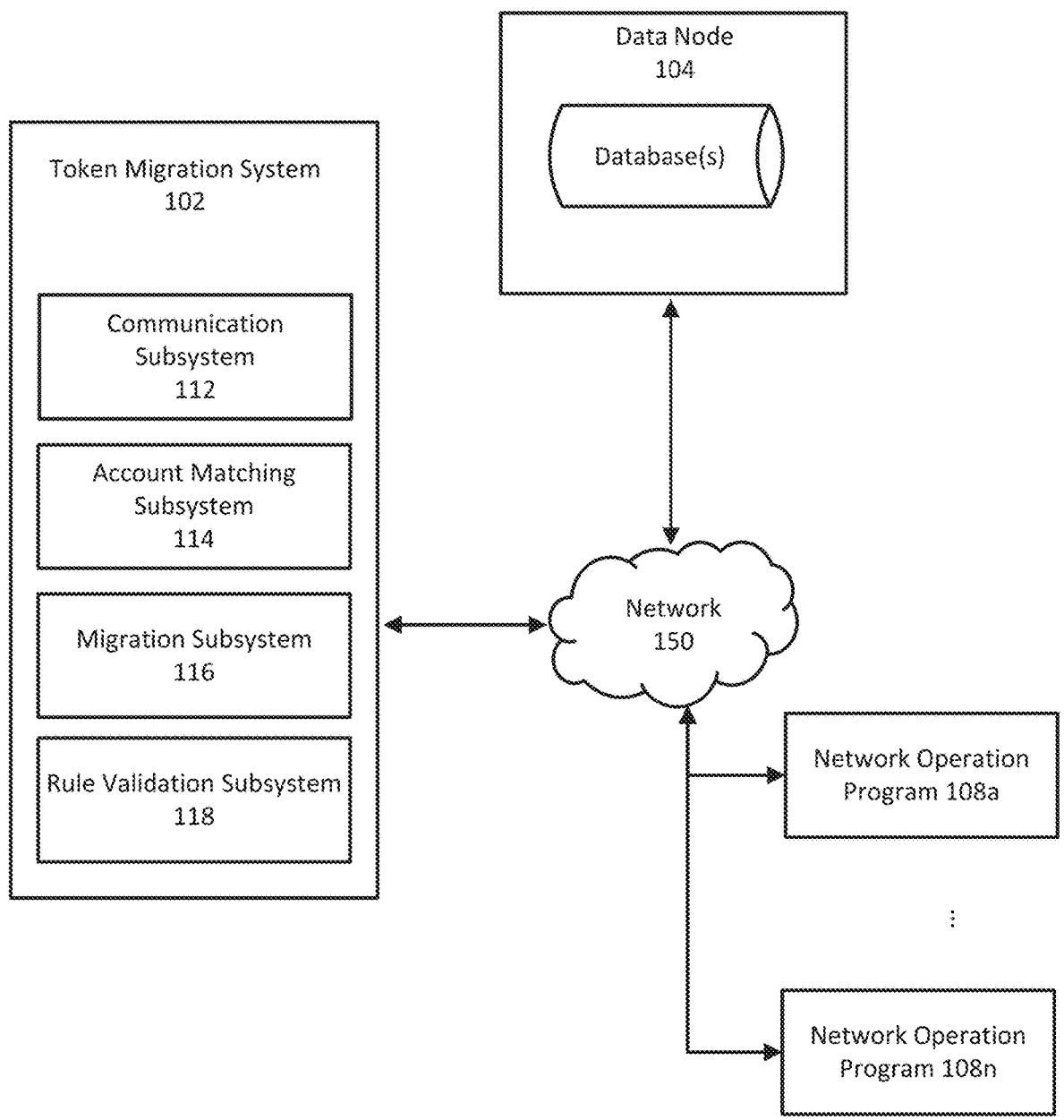
FIG. 1 shows an illustrative environment for moving access tokens for validating network operations between user accounts to prevent malicious or nonaligned usage, in accordance with one or more embodiments.

FIG. 1 shows an illustrative environment for moving access tokens for validating network operations between user accounts to prevent malicious and nonaligned usage, in accordance with one or more embodiments. Environment 100 may include token migration system 102, data node 104, network 150 and network operation programs 108a-108n. Token migration system 102 may include software, hardware, or a combination of both and may reside on a physical server or a virtual server running on a physical computer system. In some embodiments, token migration system 102 may be configured on a user device (e.g., a laptop computer, a smartphone, a desktop computer, an electronic tablet, or another suitable user device). Furthermore, token migration system 102 may reside on a cloud-based platform and/or interface with cloud-based platforms, as well as network operation programs 108a-108n, either directly or indirectly.

Data node 104 may store various data, including one or more machine learning models, training data, user account information (e.g., user account parameters, token bindings, or transfer rules), and/or other suitable data. Data node 104 may include software, hardware, or a combination of the two. In some embodiments, token migration system 102 and data node 104 may reside on the same hardware and/or the same virtual server or computing device. Network 150 may be a local area network, a wide area network (e.g., the Internet), or a combination of the two. Network operation programs 108a-108n may reside on client devices (e.g., desktop computers, laptops, electronic tablets, smartphones, servers, and/or other computing devices that interact with a network, such as network 150).

Token migration system 102 may receive data, such as account parameter data, token binding data, access token data, account creation data, or user interface input/output data (e.g., from a user's selection on a user interface), from one or more devices. Token migration system 102 may receive data using communication subsystem 112, which may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 104 or another computing device. Communication subsystem 112 may send or receive data, such as account-related information, commands, token bindings, or transfer rules. Communication subsystem 112 may communicate with account matching subsystem 114, migration subsystem 116 and/or rule validation subsystem 118.

In some embodiments, token migration system 102 may include account matching subsystem 114. Account matching subsystem 114 may perform tasks that include determining whether access tokens may be available for migration between accounts (e.g., between a primary account and a secondary account). For example, account matching subsystem 114 may receive, through communication subsystem 112, transfer rules, account parameters and account information and, along with rule validation subsystem 118, may determine whether an access token is available for migration between two given user accounts. Account matching subsystem 114 may include software components, hardware components, or a combination of both. For example, account matching subsystem 114 may include software components, or may include one or more hardware components (e.g., processors) that are able to execute operations capable of validating access token migration between user accounts. Account matching subsystem 114 may access data, such as account information, parameters, transfer rules, or token bindings, which may be stored, for example, in a memory system. Account matching subsystem 114 may directly access data or nodes associated with a blockchain network or a cloud-based device, and may be able to transmit data, through communication subsystem 112, to these nodes or other computing devices. Account matching subsystem 114 may, additionally or alternatively, receive data from and/or send data to communication sub system 112, migration sub system 116, or rule validation sub system 118.

Migration subsystem 116 may execute tasks relating to the migration of access token bindings between user accounts once, for example, account matching subsystem 114 has deemed the user accounts to match. Migration subsystem 116 may include software components, hardware components, or a combination of both. In some embodiments, migration subsystem 116 may receive rule validation results from rule validation subsystem 118, determinations of account matching from account matching subsystem 114, or other communications through communication subsystem 112 from data node 104 or network operation programs 108a-108n. In some embodiments, migration subsystem 116 may execute the migration of access token bindings by deleting original access token bindings associated with a first account and recreating identical access token bindings associated with a second user account. In some embodiments, migration subsystem 116 may execute the migration of access tokens by modifying a parameter associated with the access token that describes the access token binding. Migration subsystem 116 may wait to receive a user's selection or decision on a user interface to switch an access token binding. Migration subsystem 116 may send and/or receive information or data from data node 104, network 150 or network operation programs 108a-108n.

Rule validation subsystem 118, within token migration system 102, may execute tasks relating to validating transfer rules. For example, rule validation subsystem 118 may receive or retrieve transfer rules associated with a user account through communication subsystem 112 from a database on data node 104. In response to receiving these transfer rules, rule validation subsystem 118 may determine whether and to which other account a migration of access tokens bound to the user account may be allowed. Rule validation subsystem 118 may also receive account parameter information, for example from data node 104, as well as account matching information, for example from account matching subsystem 114, in order to validate that received transfer rules are consistent with the available data regarding the user accounts in question. In some embodiments, rule validation subsystem 118 may compare rules with account information using Boolean logic, machine learning models, or other algorithms that may provide information about the relationship between accounts. Rule validation subsystem 118 may send or receive data, and this data may be accessed from or transmitted to communication subsystem 112, account matching subsystem 114, or migration sub system 116.

FIG. 2 illustrates exemplary data structures holding parameters and token bindings for user accounts, as well as transfer rules between accounts, in accordance with one or more embodiments. Data structure 200 may include data substructures 202 and 212 for user accounts 1 and 2, respectively. Data structure 200 may store or represent information relating to account parameters, as in data substructures 204 or 214, token bindings, as in data substructures 206 or 216, or transfer rules, as in data structure 208 relating to user account 1. User account information stored in data structure 200 may originate in data nodes 104 or network operation programs 108a-108n, for example, through network 150, and may be communicated through communication subsystem 112.

Data substructures 202 and 212 may include any information relating to user accounts (e.g., account 1 and account 2). As referred to herein, user accounts may include any established relationship between a user and a computer, computing service, server, network or information service. User accounts may include data indicating or authenticating user identities, such as usernames and passwords, profiles, accounts, and pages and may have one or more types. For example, user accounts may be used as identities in software applications related to messaging, banking, or social media, and may have many security levels, such as administrator or standard levels. In some embodiments, a user account may represent a banking account, such as a checking, savings or credit card account, where the user account serves as a secure interface for a customer to access funds, execute transactions, monitor credit, or track rewards. User accounts may be separated into multiple secondary accounts, sometimes referred to as virtual accounts. For example, virtual credit card accounts may have virtual credit card numbers that may be charged by a different merchant. However, the charges will be associated with a main or a primary account. Additionally or alternatively, accounts 1 and 2 in FIG. 2 may represent secondary accounts (e.g., virtual credit card numbers) within a primary account (e.g., a credit card account held by a financial institution). Each secondary account may utilize access tokens, which may allow a merchant to charge the account. For example, a user may have a particular credit card account (e.g., a primary account). Based on that credit card account, the user may create multiple (e.g., five) virtual credit card numbers (e.g., secondary accounts) for tracking charges from different merchants. Each secondary account affiliated with a primary account may have an access token. Each access token may be used by a particular merchant to whom the user disclosed the account to charge the credit card account. That is, the merchant may transmit the access token to the financial institution holding the account to charge the account (e.g., for goods or services). The financial institution may authenticate the access token and transmit a success notification to the merchant. Data substructures 202 and 212 may include binding fields, which relate the individual user accounts to corresponding access tokens. In addition to binding fields, a user account may include parameters that relate to the user, features related to the account, or metadata with respect to the account, such as those depicted in data substructures 204 or 214.

As referred to herein, a parameter may include data, information, or labels corresponding to a financial account. For example, data substructure 204, holding parameters for account 1, may include an account number corresponding to account 1, a user ID (i.e., a user identifier) corresponding to the identity of the account's user, an expiration date for the account, an interchange rate relating to transactions between accounts, an account type, and an account age. Note that parameters may describe the user account. By including parameters that identify and characterize the account, token migration system 102 may receive enough contextual information about the user account to make security decisions about whether access tokens may be migrated between accounts. Without receiving this parametric account information, rule validation subsystem 118 and account matching subsystem 114 may not have sufficient information to make determinations or recommendations for the migration of token bindings, for example through migration sub system 116.

Parameters in data substructures 204 or 214 may include an account number. An account number may be an identifier of a user account. For example, an account number may include a string of numbers, letters or other characters that identify an account. Account numbers may also include, for example, routing numbers for banks, as well as credit card numbers. In some embodiments, account numbers may have between 8 and 12 digits, and may be unique within a bank or institution. Account numbers may indicate an account type—for example, the suffix of the account number may indicate if a bank account is a checking, savings, or credit card account. For example, an account number may include a credit card number or a virtual credit card number associated with a virtual credit card account. Account number information may provide token migration system 102 a way to identify accounts between which tokens may migrate, in a manner that is unique and unambiguous.

Parameters in data substructures 204 or 214 may include an account type. An account type may provide information regarding the features, behavior or nature of a user account. Within data substructure 202 or 212, account type information may be represented by a text string of characters, a numerical code, or a mix of alphanumeric characters. For example, a bank account may exhibit different interest rates, rewards, or deposit/withdrawal rules depending on the account type. For example, an account may be a checking account, where funds may be withdrawn or deposited with little restriction, while a savings account may provide a higher interest rate but more limitations on allowed transfers. Credit card accounts may, for example, have different types signaling the operation network, the annual rate, or the nature of rewards. As different accounts may be used for different purposes, and with different consequences, access tokens that are compatible with one account type may not be compatible with another account type, even if both accounts are in the same institution or on the same platform, for instance. For example, it may be infeasible to transfer an access token that is a virtual credit card number from a credit card account to a debit card account without modifying the access token itself, as the nature of network operations may differ between the two. Thus, considering account type information may be helpful for token migration system 102, account matching subsystem 114, and rule validation subsystem 118 in determining whether accounts match and, subsequently, whether an access token may be allowed to migrate from one account to another.

Parameters in data substructures 204 or 214 may include a user identifier (user ID). A user ID may be any object representing the identity of a user of a user account. For example, a user ID may include a customer identification number, a user's name, a birthdate, or a combination of many identifiers. A user ID, additionally or alternatively, may include a username created by a customer for the purpose of logging onto an online system, such as a web application. As access tokens may be used as a safety mechanism for allowing access to an account only to particular users, they may only be migratable in circumstances where two user accounts are owned by the same user. In some embodiments, token migration system 102 may detect the creation of a new user account and compare its corresponding user ID to user IDs in other accounts and, in response to this detection, validate whether an access token may be transferred from one account to another. As such, user ID information within account parameters may provide helpful information to rule validation subsystem 118 in order to ensure that accounts are owned by the same users before allowing migration of access tokens.

Parameters in data substructures 204 or 214 may include an expiration date. An expiration date may be a time, date, or temporal marker after which a user account is no longer in effect. In some embodiments, an expiration date may reflect a date on which a contract or terms between the user and the manager of the user account may expire. For example, credit card accounts may have expiration dates years beyond initial account activation. Expiration dates may prevent fraud or misuse, as user accounts may need to be re-validated before being extended beyond expiration. Access tokens themselves may include expiration dates and, in many cases, these access token expiration dates may be sooner than for a parent user account, in order to limit the possibility of fraud. Token migration system 102 may permit the transfer of access tokens in different situations depending on the expiration date. For example, token migration system 102 may only allow a transfer of an access token associated with a virtual credit card number to a credit card account with a better rewards scheme if the second account is expiring soon, such that the access token is not misused to exploit rewards of a better account. In this way, an expiration date may provide important context for account administrators in determining whether an access token migration decision may be beneficial to the user, the platform, or the bank.

Parameters in data substructures 204 or 214 may include an interchange rate. An interchange rate may include an indication of rules (e.g., fees) in effect during transactions that are processed using a given user account. For example, an interchange rate may include a fee charged by banks to merchants who process credit card or debit card payments. A credit card account may include an interchange rate, which may be a fee that a merchant must pay for every credit card transaction with the given credit card account. Interchange rates may be controlled by the administrator of a user account and may be dependent on other parameters, such as account type or expiration dates. Because interchange rates may differ between user accounts, allowing a user to migrate access tokens from one user account to another may not be beneficial to account administrators. Token migration system 102 may leverage rule validation subsystem 118 to make decisions with respect to interchange rates based on received transfer rules. Thus, token migration system 102 may account for differences in interchange rates and may only allow for migration where interchange rate differences may not cause significant changes.

Parameters in data substructures 204 or 214 may include an account age. An account age may include an indication of how long an account has been open. In some embodiments, rather than account age, parameters in data substructures 204 or 214 may include an account opening date, whereby an account age may be calculated. For example, an account age may be calculated from the date a credit card application is granted by a bank. By including account age in the parametrization of user accounts, token migration system 102 may receive information regarding the security of the account and corresponding user. For example, an account that is very new may be more susceptible to fraud or misuse of credit than an account that has been long-established. Thus, token migration system 102 may, in some embodiments, only allow for access token migration between accounts that are older or more established, to prevent further misuse of the access tokens. As such, account age may provide information that aids in the validation of any request to migrate access tokens between user accounts.

As referred to herein, an access token may include an object, a data structure, a feature or an application that encapsulates the security identity of a process or a thread. In some embodiments, an access token may be a virtual credit card number. An access token may include information about a user's privileges, identity, or transactions, and may be used to make security decisions, or store information regarding an entity, such as a user, securely. For example, an access token may include a virtual account number (e.g., a controlled payment number, a disposable credit card number, or a virtual credit card number), which may be an alias for a credit card number and may be used to complete transactions without revealing account information. Access tokens may be associated with secondary accounts linked to a primary account. For example, virtual credit card accounts may allow transactions to be processed by the same primary credit card accounts through the use of virtual credit card numbers. In some embodiments, access tokens may have cryptographic properties, and may leverage symmetric or asymmetric encryption or allow for digital signatures with public, private or "valet" keys. By leveraging access tokens in controlling user accounts, such as financial accounts, a system may reduce the possibility of fraud and identity theft by hiding account parameters when processing network operation requests, such as transactions.

As referred to herein, a token binding may include any relation or link between an access token (e.g., a virtual credit card number) and a user account (a primary account associated with the virtual credit card number). A token binding, examples of which are shown in data substructures 206 or 216, may include a pointer, associated with a user account, that is linked to an identifier of an access token. In some embodiments, access tokens themselves may include a parameter or field identifying or relating to a user account to which it is bound. Token bindings may have similar properties or parameters as user accounts, such as expiration dates, card verification values (CVVs) or virtual account numbers, but these properties may have different values. By including token bindings in account data or access token data, token migration system 102 may access information relating to which access tokens are connected to which user accounts, which allows migration subsystem 116 to identify access tokens that may be available for transfer, as well as physically process the access token migration request by modifying the corresponding token binding.

User accounts may also have associated transfer rules. For example, as shown in FIG. 1, account 1 may require transfer rules in data structure 208 for access migration to be allowed. As referred to herein, a transfer rule may include any rules, requirements or criteria associated with a user account for allowing a migration of access tokens. Transfer rules in data structure 208 associated with a user account may dictate requirements relating to other user accounts that may need to be satisfied before access token migration is allowed. In some embodiments, transfer rules in data structure 208 may include conditions relating to account parameters that need to be satisfied before access token migration is allowed. Conditions may be represented in data structure 208 as comparison or logical operators (e.g., greater than, less than, or is equivalent to). For example, as shown in FIG. 1, transfer rules in data structure 208 for account 1 may require that the user ID for an account to which the access token is to be migrated must be equivalent to account 1's user ID, or that the account type should be the same (e.g., both accounts should be of the "rewards" type). Similarly, transfer rules in data structure 208 for account 1 may require that the account to which the access tokens may be transferred should have an expiration date before 13 Sep. 2026. In some embodiments, transfer rules in data structure 208 may dictate requirements relating to the same user account that may need to be satisfied before access token migration is allowed. By maintaining a list of circumstances in which access tokens may be migrated from an account, token migration system 102, through rule validation subsystem 118, may ensure that all necessary requirements are satisfied before any access tokens are transferred. Retrieving these transfer rules, then, accords account administrators fine control over the situations where these transfers may take place, which has the potential to improve account security, stability, and customer experience (e.g., by preventing access tokens to be used with the wrong type of user accounts).

Figure 3:
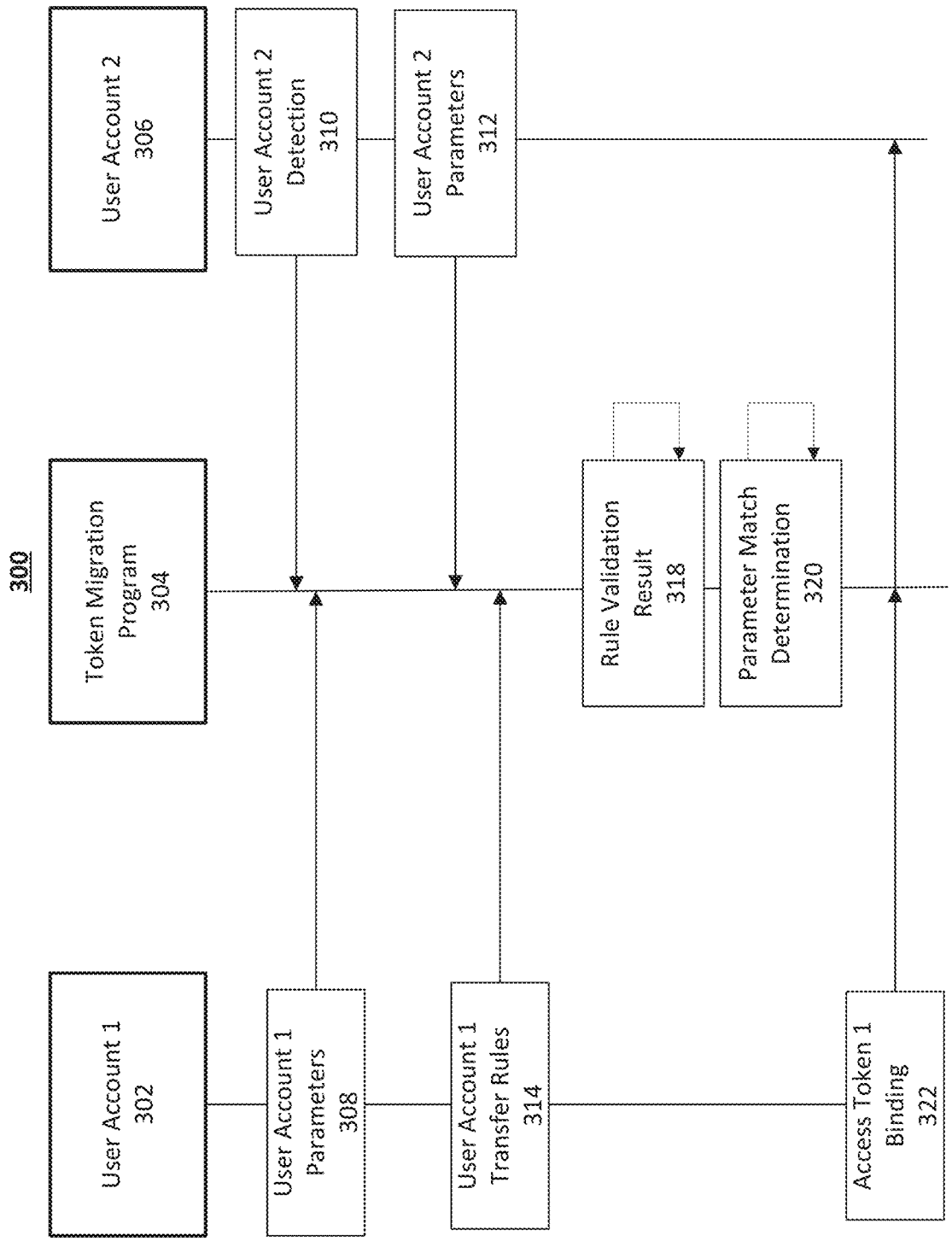
FIG. 3 illustrates a workflow for validating the migration of tokens between user accounts, in accordance with one or more embodiments.

FIG. 3 illustrates workflow 300 for validating the migration of tokens between user accounts, in accordance with one or more embodiments. For example, FIG. 3 illustrates a workflow for detecting the creation of a new user account, retrieving account parameters and transfer rules from the suitable user accounts, validating that transfer rules are satisfied, determining that parameters match and, in response, updating an access token binding from one user account to another.

Token migration system 102 may determine that a user is associated with two user accounts. That is, token migration system 102 may, through token migration program 304, determine that a user is associated with a first user account 302 (e.g., user account 1) and a second user account 306 (e.g., user account 2). The first user account may be associated with a plurality of access tokens, and each access token may be associated with a corresponding plurality of parameters and used in processing network operation requests in relation to the first user account. For example, token migration system 102 may determine, through a user identifier, that two accounts within a financial institution are controlled by the same user or customer. The first account may have access tokens, such as virtual account numbers or cards, that enable the use of aliases when processing network operation requests, which may include transactions, for example. As access tokens operate as security-based objects for authenticating transactions, any transfer of access tokens between user accounts is likely allowable only if both accounts are controlled by the same user. Thus, in determining that the two accounts have common owners, token migration system 102 may ensure that any migration of access tokens is secure and protects the security of the account user.

In some embodiments, token migration program 304 may receive detection of the creation of the second account (i.e., operation 310) and determine whether to migrate access tokens based on this detection. That is, token migration system 102 may detect a creation of the second user account corresponding to the user, and, in response to detecting the creation of the second user account, account matching subsystem 114 and/or rule validation subsystem 118 may determine whether to migrate one or more access tokens from first user account 302 to the second user account 306. For example, upon creating a new user account for a given user, token migration program 304 may receive a notification or through communication subsystem 112 from another device on network 150 that is responsible for account creation. In some embodiments, token migration system 102 may send an account detection request and receive a detection message in response to the detection request. In some embodiments, token migration system 102 may reside on a computer device that has access to account creation information, enabling token migration system 102 to detect the new user account itself. By detecting the creation of another user account, token migration system 102 may suggest or recommend access token migration from one account to the new account without a user's express request or desire to do so, for example, through generating for display a suggestion or recommendation on a user interface depicted as token binding selection interface 402 in FIG. 4. As a result, users may receive an improved customer experience, as they may be notified of being able to keep original access tokens attached to the new account without updating information with vendors, while still taking advantage of a newly created account.

Token migration system 102 may retrieve parameters associated with the two accounts. That is, token migration program 304 may retrieve a first plurality of parameters 308 associated with user account 1 and a second plurality of parameters 312 associated with user account 2. In some embodiments, token migration system 102 may receive these parameters through communication subsystem 112, or may send a request for these parameters to servers managing the two user accounts and receive responses from the servers. Parameters corresponding to each user account may have the data substructures as shown in FIG. 2 (i.e., data substructures 204 and 214). By receiving parameters relating to each user account under consideration, account matching subsystem 114 may have enough information to determine if the accounts match and, as a result, make further determinations regarding whether access token migration is allowed. Thus, token migration system 102 may ensure that only access token migrations that will not result in security, compatibility or user experience issues, may occur.

In some embodiments, parameters relating to the access tokens may be inherited from the first user account. That is, one or more parameters of the corresponding plurality of parameters may be inherited from the first user account. For example, token migration system 102 may already have access to information about the first user account, such as where token migration program 304 is stored on the same system as user accounts. In this case, token migration system 102 may extract parameters relating to the access tokens from the user account to which the access tokens are bound. In this way, token migration program 304 may ensure that the parameters characterizing the access tokens linked to a user account are consistent with and compatible with the user account itself, which provides a way to prevent unauthorized modification of the access token itself.

Account matching subsystem 114 may determine that an access token is available for migration between user accounts. That is, account matching subsystem 114 may determine (e.g., at operation 320), based on the first plurality of parameters 308 matching the second plurality of parameters 312, that a first access token from a plurality of access tokens is available for migration from user account 1 (302) to user account 2 (306). For example, account matching subsystem 114 may determine that user accounts (e.g., two credit card accounts) match, as the two accounts are of the same type (e.g., rewards-type credit card accounts) and are controlled by the same user. In some embodiments, expiration dates, interchange rates, or any of parameters listed in data substructures 204 or 214, may be compared, analyzed or otherwise considered in determining whether the user accounts match or not. By comparing user account parameters before allowing migration of access tokens (e.g., virtual credit card numbers), account matching subsystem 114 may ensure that the access token, originally associated with a first user account, is indeed compatible with the new user account before allowing for a transfer. Without doing so, token migration system 102 may risk allowing an access token migration that harms the user or the administrator, for example due to security or fraud issues.

Before performing operation 320, token migration system 102 may transfer rules from the first user account as in operation 314, before validating that these rules are satisfied and that, as a result, may determine that the user accounts indeed match. That is, token migration system 102 may retrieve a plurality of transfer rules in operation 314 associated with the first user account, such as those in data structure 208, validate the second plurality of parameters associated with the second user account with the plurality of transfer rules (as in operation 318), and, in response to determining that validation is successful, determine that the first plurality of parameters matches the second plurality of parameters (as in operation 320). As shown in data structure 208, account 1 may only allow for access token migration in the event that parameters associated with the user account 2 satisfy certain conditions. For example, transfer rules in data structure 208 may require that account 2 has the same user ID and account type as account 1, and may also require that account 2 has an expiration date sooner than 13 Sep. 2026 and an interchange rate of greater than 1.5%. By specifying rules for when a migration of access tokens may be allowed, an administrator of user accounts may have precise control over any transfer that may harm or benefit either the administrator or the user, based on providing this ruleset for allowing this migration. By doing so, token migration system 102, through rule validation subsystem 118, may ensure that any rules specified by the administrator are satisfied and, thus, may ensure that the administrator may continue to maintain the security and integrity of the account system by preventing any access token migration between incompatible account types.

In some embodiments, account matching subsystem 114 may receive a determination for whether to migrate an access token between two accounts from a machine learning model. That is, account matching subsystem 114 may input the first plurality of parameters, the second plurality of parameters, and metadata associated with the first user account into a machine learning model trained to determine whether to migrate access tokens between two user accounts. Token migration system 102 may then receive, from the machine learning model, a determination whether to migrate the first access token from the first user account to the second user account. For example, account matching subsystem 114 may interact with a machine learning model, and input data (substructures 204, 208 and 214), as well as additional metadata associated with the first user account, into the machine learning model. The machine learning model, in some embodiments, may be trained with similar user account data, as well as data regarding outcomes of previous access token migrations, such as economic effect, security effects or user experience effects. For example, the machine learning model may be trained based on data relating to a financial institution's profitability from a user in response to transferring an access token between accounts with differing interchange rates. As a result, in this example, the machine learning model may learn situations in which access token migration may be beneficial for the account administrator and, as a result, may be able to generate a prediction or a recommendation based on knowledge of the user accounts associated with the migration in question. By leveraging machine learning models, account matching subsystem 114 may take advantage of a results-driven, situation-dependent approach to allowing or prohibiting the migration of access tokens, enabling an account administrator to make more efficient, beneficial decisions.

In some embodiments, determining whether parameters associated with the user accounts match may include retrieving an expiration date parameter associated with the first user account and disabling the option to migrate access tokens based on this expiration date parameter. That is, account matching subsystem 114 may retrieve an expiration date parameter associated with the first user account and, based on determining that the expiration date parameter is not within a threshold time period, disable an option to migrate the first access token. For example, parameters in data substructure 204 may include an expiration date. Rule validation subsystem 118 may determine that access tokens may only be migratable if the first user account is close to expiring, defined by the threshold time period. As referred to herein, a "threshold time period" may include a period of time within which an expiration date should be from a current date, in order for migration to be allowed. For example, a threshold time period may be determined by an administrator of user accounts or another such entity, and may be determined by security factors or economic incentives. By ensuring that migration may only occur where a user account is near expiry, token migration system 102 may enable a migration of access tokens only in the event of necessity (i.e., that the original user account may be soon inoperable). Additionally, this backstop enables an administrator to discourage long-term use of an access token to access benefits of another account to which the original account and access token may not be entitled or configured. Thus, utilizing an expiration date parameter allows a system administrator to control access token migration and to protect against exploitation of account features or rewards.

In some embodiments, determining whether parameters associated with the user accounts match may include retrieving an interchange parameter associated with the second user account and determining a match between user accounts based on this interchange parameter. That is, account matching subsystem 114 may retrieve an interchange parameter associated with the second user account, validate the interchange parameter against one or more transfer rules and, in response to determining that validation is successful, determine that the first plurality of parameters matches the second plurality of parameters. For example, parameters in data substructure 214 may include an interchange rate (i.e., an interchange parameter). Rule validation subsystem 118 may determine, based on received transfer rules, that access tokens may only be migratable if, for example, the interchange parameter corresponding to the second user account is greater than the interchange parameter for the first user account. As discussed above, a decision to allow migration of access tokens may depend on interchange parameters for economic or profit reasons, for example, to prevent users from exploiting an access token corresponding to a lower interchange rate in a new account. Thus, by incorporating interchange parameters into a decision to allow migration of access tokens, a user account administrator may ensure that migration subsystem 116 carries out only equitable transfers that may not harm either the administrator or merchants/users.

Having determined that an access token is available for migration between the user accounts as in operation 320, migration subsystem 116 may update the access token's binding to the second user account, as shown in operation 322. That is, migration subsystem 116 may update a binding associated with the first access token from the first user account to the second user account. For example, migration subsystem 116 may modify token bindings represented in data substructure 206 (i.e., corresponding to the first user account) to delete the relevant access token and populate the token binding in data substructure 216 (i.e., in the structure corresponding to the second user account). Additionally or alternatively, migration subsystem 116 may modify a pointer or reference to the user account that is stored within the access token itself accordingly. By modifying the token binding, migration subsystem 116 may effectuate any decisions to migrate the access token validated in previous operations and, as such, may enable token migration system 102 to update the relationship between the access token and the user accounts. Thus, token migration system 102 achieves the practical benefit of ensuring the security and compatibility of the access token with the new user account, while allowing for a seamless transition for the user between the two accounts.

Figure 4:
FIG. 4 illustrates a user interface for confirming the migration of tokens between user accounts, in accordance with one or more embodiments.

FIG. 4 illustrates a user interface for confirming the migration of tokens between user accounts, in accordance with one or more embodiments. For example, FIG. 4 depicts user interface 400 with token binding selection interface 402 within. Token binding selection interface 402, in turn, includes two token selection boxes 404 and 406, where each access token associated with a user is displayed (e.g., associated with a common user identifier). Within each token selection box, a list of accounts associated with the user may be displayed. For example, accounts that are already associated with a token corresponding to the token selection box may be in gray, while accounts for which token migration system 102 has determined that migration is not possible may be thatched out, as shown in FIG. 4. Alternatively, accounts that token migration system 102 has determined match the current account associated with the token may allow a token migration. Note that, as different accounts associated with different tokens may have different account parameters, the subset of allowed accounts to which token migrations may be allowed may differ. For example, token x3421 shown in token selection box 404 may be allowed to migrate from Account 1 to Account 3 or 4, but not Account 2. On the other hand, token x6432 shown in token selection box 406 may be allowed to migrate from Account 2 only to Accounts 1 or 3, but not Account 4. This difference may reflect differences between transfer rules associated with accounts 1 and 2, as well as differences in respective account parameters for all accounts involved.

In some embodiments, token migration system 102 may transmit a command to display options for binding access tokens with user accounts and may allow the user to select from these options. That is, token migration system 102 may transmit, to a user device, a command to display a plurality of options on user interface 400 (e.g., through token binding selection interface 402), wherein the command includes a plurality of indications for the plurality of access tokens (e.g., token selection boxes 404 and 406), and wherein the plurality of options enable the user to select the first access token to migrate to the second user account. In response to receiving, from the user device, a selection of an option associated with the first access token, migration subsystem 116 may update the binding associated with the first access token. By showing options to a user for where access tokens may be migratable, token migration system 102 enables user control of account use. For example, if a user has opened a new user account, but has previously provided a merchant with an access token, such as a virtual account number associated with an older user account, the user may choose to transfer the access token to the new account, if allowed, without updating the payment details with the vendor. By issuing a command to display all possible options on a user interface, token migration system 102 affords the user improved control over these access tokens. As a result, token migration system 102 makes account migration a more seamless experience for a user.

Upon a user selection of a new account to which to transfer an access token, or upon any other system determination of permission for migration, migration subsystem 116 may update the binding associated with the access token from the first user account to the second account. For example, migration subsystem 116 may update data substructure 206 corresponding to the first user account to delete the entry corresponding to the access token and, in turn, append the access token to data substructure 216, corresponding to the second user account. In some embodiments, the access token itself includes information relating to its binding with a given account, where updating the token binding may include updating the entry corresponding to the user account to which the token is bound (e.g., updating an account number associated with the access token). Thus, in some embodiments, updating the token binding may involve deleting and recreating the relevant binding, while in some embodiments, updating the token binding may involve modifying the existing token binding. By updating the binding, token migration system 102 ensures that any future transactions, network operations, or actions taken through the access token may be linked to the correct user account following migration, which reduces the likelihood of operation processing errors with the relevant user accounts.

In response receiving such an operation request, token migration system 102 may then process the request using the second user account. That is, token migration system 102 may, in response to receiving a network operation request associated with the first access token, process the network operation request using the second user account. For example, a user, after having migrated an access token corresponding to a virtual account number from an old account to a new account, may utilize this access token with a vendor to make a purchase. Network 150 may subsequently process the sales transaction using the updated token binding to a new account, rather than the original token binding to the old account. By doing so, the user may ensure that their new account processes the transaction request, while the old user account is not involved in the processing. Thus, the user's opening of a new account may not affect the user's transactions, while the user may still receive the benefits of the new account. This process makes migrating between accounts seamless for the user.

As referred to herein, a "network operation request" may refer to a request by a system to carry out a network operation, for example using network operation programs 108*a*-108*n*. A network operation may include any calculation, transaction, or communication between components or devices in a network (e.g., network 150). For example, a network operation request may include a request to transfer funds from one user account to a merchant on a credit card network, such as through a credit card transaction at a point-of-sale. A network operation request may, alternatively or additionally, include a request to send a message from one user device to another through a social media platform, for example. As many network operations operate between user accounts, access tokens provide ways to authenticate users requesting such operations, by providing an alias for the user without divulging sensitive account details. By allowing access tokens to modify their bindings to particular user accounts, the system may process network operation requests using different user accounts.

Figure 5:
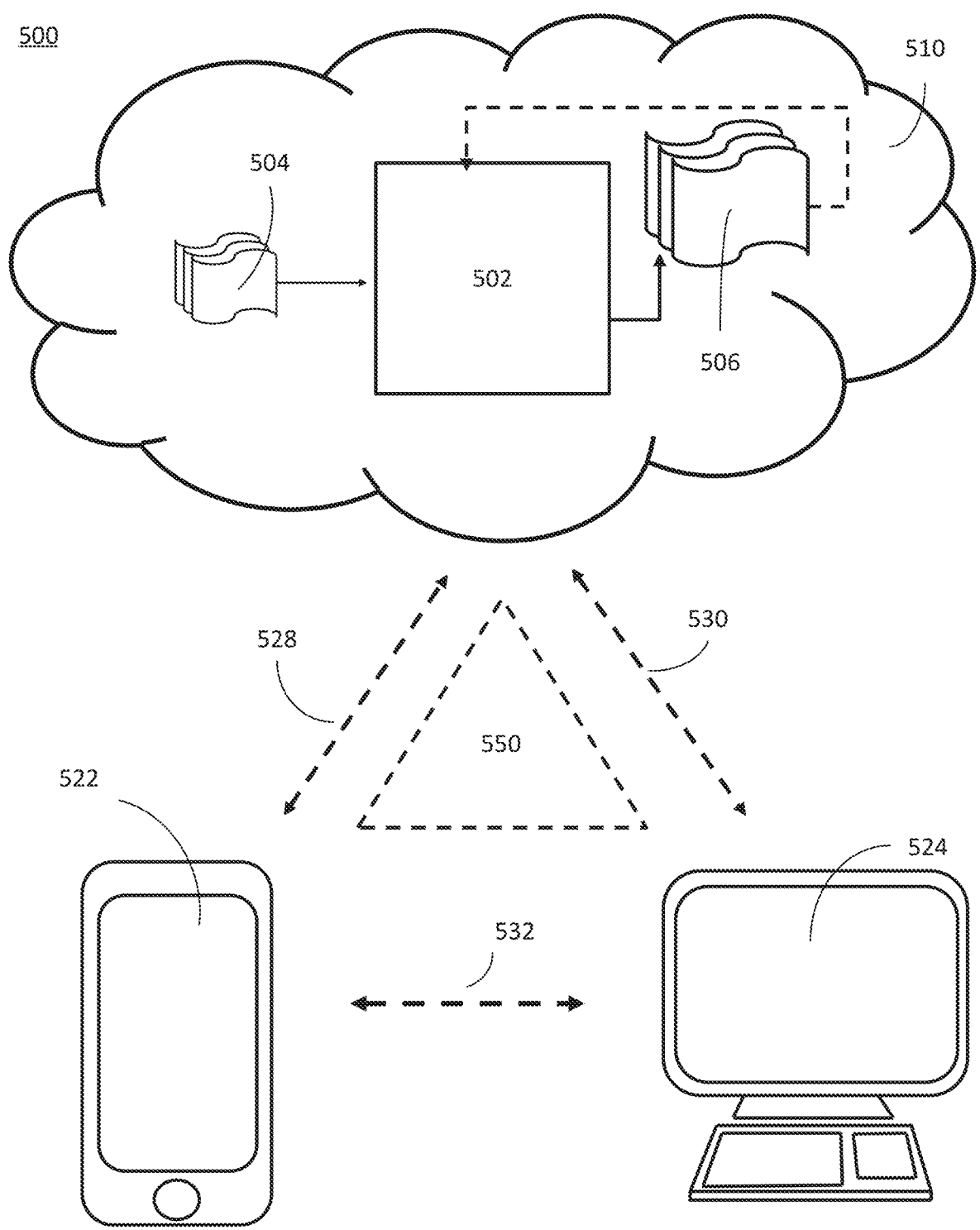
FIG. 5 shows illustrative components for a system for validating the migration of tokens between user accounts using machine learning, in accordance with one or more embodiments.

FIG. 5 shows illustrative components for a system used alongside machine learning models, in accordance with one or more embodiments. For example, FIG. 5 may show illustrative components for validating the migration of access tokens for network operations between user accounts to prevent malicious or nonaligned usage, while using machine learning to provide recommendations for this validation. As shown in FIG. 5, system 500 may include mobile device 522 and user terminal 524. While shown as a smartphone and personal computer, respectively, in FIG. 5, it should be noted that mobile device 522 and user terminal 524 may be any computing device, including, but not limited to, a laptop computer, a tablet computer, a hand-held computer, and other computer equipment (e.g., a server), including "smart," wireless, wearable, and/or mobile devices. FIG. 5 also includes cloud components 510. Cloud components 510 may alternatively be any computing device as described above, and may include any type of mobile terminal, fixed terminal, or other device. For example, cloud components 510 may be implemented as a cloud computing system, and may feature one or more component devices. It should also be noted that system 500 is not limited to three devices. Users may, for instance, utilize one or more devices to interact with one another, one or more servers, or other components of system 500. It should be noted, that while one or more operations are described herein as being performed by particular components of system 500, these operations may, in some embodiments, be performed by other components of system 500. As an example, while one or more operations are described herein as being performed by components of mobile device 522, these operations may, in some embodiments, be performed by components of cloud components 510. In some embodiments, the various computers and systems described herein may include one or more computing devices that are programmed to perform the described functions. Additionally, or alternatively, multiple users may interact with system 500 and/or one or more components of system 500. For example, in one embodiment, a first user and a second user may interact with system 500 using two different components.

With respect to the components of mobile device 522, user terminal 524, and cloud components 510, each of these devices may receive content and data via input/output (hereinafter "I/O") paths. Each of these devices may also include processors and/or control circuitry to send and receive commands, requests, and other suitable data using the I/O paths. The control circuitry may include any suitable processing, storage, and/or input/output circuitry. Each of these devices may also include a user input interface and/or user output interface (e.g., a display) for use in receiving and displaying data. For example, as shown in FIG. 5, both mobile device 522 and user terminal 524 include a display upon which to display data (e.g., conversational response, queries, and/or notifications).

Additionally, as mobile device 522 and user terminal 524 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 500 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 5 also includes communication paths 528, 550, and 532. Communication paths 528, 530, and 532 may include the Internet, a mobile phone network, a mobile voice or data network (e.g., a 5G or LTE network), a cable network, a public switched telephone network, or other types of communications networks or combinations of communications networks. Communication paths 528, 530, and 532 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 510 may include token migration system 102, communication subsystem 112, account matching subsystem 114, migration subsystem 116, rule validation subsystem 118, data node 104 or network operation programs 108a-108n, and may be connected to network 150. Cloud components 510 may access model inputs 504 and outputs 506, as well as related data. For example, cloud components 510 may access account parameters (e.g., as in data substructures 204 or 214), token bindings (e.g., as in data substructures 206 or 216) and account transfer rules (e.g., data structure 208). Cloud components 510, as well as model 502, may access information related to outcomes of prior migrations (e.g., details of user satisfaction or profitability as a consequence of access token migrations in the past, as well as user profile information), for example, for training purposes.

Cloud components 510 may include model 502, which may be a machine learning model, artificial intelligence model, etc. (which may be referred collectively as "models" herein). Model 502 may take inputs 504 and provide outputs 506. The inputs may include multiple datasets, such as a training dataset and a test dataset. Each of the plurality of datasets (e.g., inputs 504) may include data subsets related to user data, predicted forecasts and/or errors, and/or actual forecasts and/or errors. In some embodiments, outputs 506 may be fed back to model 502 as input to train model 502 (e.g., alone or in conjunction with user indications of the accuracy of outputs 506, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., an expectation of failure of applying a given model to a given dataset).

In a variety of embodiments, model 502 may update its configurations (e.g., weights, biases, or other parameters) based on the assessment of its prediction (e.g., outputs 506) and reference feedback information (e.g., user indication of accuracy, reference labels, or other information). In a variety of embodiments, where model 502 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 502 may be trained to generate better predictions.

In some embodiments, model 502 may include an artificial neural network. In such embodiments, model 502 may include an input layer and one or more hidden layers. Each neural unit of model 502 may be connected with many other neural units of model 502. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 502 may be self-learning and trained, rather than explicitly programmed, and can perform significantly better in certain areas of problem solving, as compared to traditional computer programs. During training, an output layer of model 502 may correspond to a classification of model 502, and an input known to correspond to that classification may be input into an input layer of model 502 during training. During testing, an input without a known classification may be input into the input layer, and a determined classification may be output.

In some embodiments, model 502 may include multiple layers (e.g., where a signal path traverses from front layers to back layers). In some embodiments, back propagation techniques may be utilized by model 502 where forward stimulation is used to reset weights on the "front" neural units. In some embodiments, stimulation and inhibition for model 502 may be more free-flowing, with connections interacting in a more chaotic and complex fashion. During testing, an output layer of model 502 may indicate whether or not a given input corresponds to a classification of model 502 (e.g., a classification of user account parameters and access token binding information into whether a migration may be beneficial).

In some embodiments, the model (e.g., model 502) may automatically perform actions based on outputs 506. In some embodiments, the model (e.g., model 502) may not perform any actions. The output of the model (e.g., model 502) may be used to make a determination as to whether to allow a migration by, for example, predicting whether an account migration may have beneficial consequences for a user or the account administrators.

System 500 also includes API layer 550. API layer 550 may enable the system to generate summaries across different devices. In some embodiments, API layer 550 may be implemented on mobile device 522 or user terminal 524. Alternatively or additionally, API layer 550 may reside on one or more of cloud components 510. API layer 550 (which may be A REST or Web services API layer) may provide a decoupled interface to data and/or functionality of one or more applications. API layer 550 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 550 may use various architectural arrangements. For example, system 500 may be partially based on API layer 550, such that there is strong adoption of SOAP and RESTful Web services, using resources like Service Repository and Developer Portal, but with low governance, standardization, and separation of concerns. Alternatively, system 500 may be fully based on API layer 550, such that separation of concerns between layers like API layer 550, services, and applications are in place.

In some embodiments, the system architecture may use a microservice approach. Such systems may use two types of layers: Front-End Layer and Back-End Layer where microservices reside. In this kind of architecture, the role of the API layer 550 may provide integration between Front-End and Back-End. In such cases, API layer 550 may use RESTful APIs (exposition to front-end or even communication between microservices). API layer 550 may use AMQP (e.g., Kafka, RabbitMQ, etc.). API layer 550 may use incipient usage of new communications protocols such as gRPC, Thrift, etc.

In some embodiments, the system architecture may use an open API approach. In such cases, API layer 550 may use commercial or open source API Platforms and their modules. API layer 550 may use a developer portal. API layer 550 may use strong security constraints applying WAF and DDoS protection, and API layer 550 may use RESTful APIs as standard for external integration.

Figure 6:
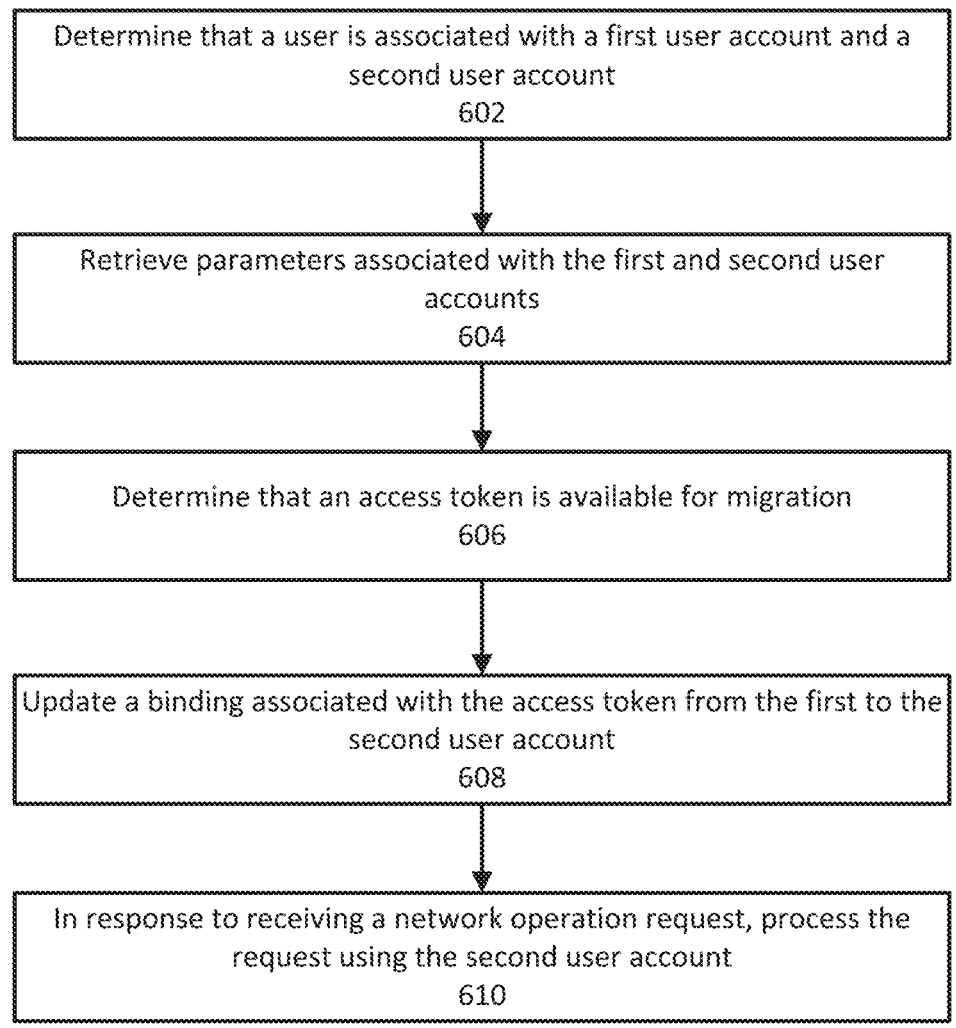
FIG. 6 shows a flowchart of operations for moving tokens between user accounts, in accordance with one or more embodiments.

FIG. 6 shows a flowchart of operations for moving tokens between user accounts, in accordance with one or more embodiments. For example, the system may use process 600 (e.g., as implemented on one or more components described above) to execute operations to validate whether an access token, such as a virtual account number, may be moved from one user account to another (e.g., from one credit card account to another credit card account).

At 602, token migration system 102 (e.g., using one or more components described above) determines that a user is associated with a first user account and a second user account. That is, token migration system 102, through system 500, may determine that a user is associated with a first user account and a second user account. The first user account may be associated with a plurality of access tokens, and each access token may be associated with a corresponding plurality of parameters and is used in processing network operation requests in relation to the first user account. System 500 may execute these operations using any of cloud components 510, mobile device 522 or a computer device corresponding to user terminal 524, for example. In some embodiments, system 500 may detect the creation of the second user account and further determine to migrate one or more access tokens based on this detection. Token migration system 102, thus, ensures that only access tokens bound to user accounts associated with the same user are able to migrate, which provides security to the transfer and prevents possible misuse from other parties without permission to the user accounts.

At 604, token migration system 102 (e.g., using one or more components described above) retrieves parameters associated with the first and second user accounts. That is, token migration system 102, through system 500, may retrieve a first plurality of parameters associated with the first user account and a second plurality of parameters associated with the second user account. For example, system 500, through cloud components 510, mobile device 522, or user terminal 524, may access data substructures 204 or 214, which may be stored on system memory or through network 150, and, as a result, token migration system 102 may receive relevant data related to the accounts under consideration for a migration. In some embodiments, token migration system 102, for example, through communication subsystem 112, may further receive transfer rules associated with the first account (e.g., as shown in data structure 208), where an administrator may have additional control over rules governing migration of access tokens across user accounts. By receiving this data, which may include account numbers, user identities, expiration dates, interchange rates, account types and account ages, token migration system 102 may receive enough information to make a decision as to whether a migration may be allowed, for example by making security, economic, or user satisfaction considerations.

At 606, token migration system 102 (e.g., using one or more components described above) may determine that an access token is available for migration. That is, token migration system 102, through system 500, may determine, based on the first plurality of parameters matching the second plurality of parameters, that a first access token from the plurality of access tokens is available for migration from the first user account to the second user account. For example, system 500 may compare account parameters for one or both of the accounts with transfer rules or with each other, in order to determine whether user accounts match and, therefore, whether access tokens may be allowed to migrate from the first account to the second account. System 500 may utilize cloud components 510, such as model 502, in order to determine whether migration may be allowed. For example, system 500 may utilize, as inputs 504, parameters, transfer rules, and information about the user and user accounts and, as outputs of model 502, system 500 may return a decision as to whether access token migration may be beneficial (e.g., to a user, to an administrator, or to the security of the system). Based on this determination, system 500 may make a determination as to whether access tokens may migrate. By doing so, token migration system 102 ensures that access tokens may migrate only where corresponding user accounts are compatible, which protects the security of the system and enables an administrator to allow migration only where it is beneficial to either a user or customer, or to the system itself.

At 608, token migration system 102 (e.g., using one or more components described above) updates a binding associated with the access token from the first to the second user account. That is, system 500, through one or more cloud components 510, may update a binding associated with the first access token from the first user account to the second user account. For example, system 500 may delete a token binding associated with the first user account (as shown in data substructure 206) and recreate it as a token binding associated with the second user account (as, for example, a record within data substructure 216). In some embodiments, system 500 may, instead, modify a binding associated with the access token itself to refer to the second user account, rather than the first user account. By updating the binding between the access token and the user account within system 500, token migration system 102 enables any future transactions, communications or other network operation requests to point to the correct binding, in a way that allows processing of these requests with the second user account rather than the first user account. In this way, a user of the access token need not create a new access token (e.g., notify a merchant of a new virtual account number and CVV code) upon creation or migration to another user account. Rather, the user may utilize the original virtual account/access token details for a seamless transition.

At 610, token migration system 102 (e.g., using one or more components described above), in response to receiving a network operation request, processes the request using the second user account. That is, using one or more of cloud components 510, in response to receiving a network operation request associated with the first access token, system 500 may process the network operation request using the second user account. For example, upon receiving a request for a transaction to purchase an item from a vendor, a user may ask the vendor to use a virtual account number that acts as an access token, which was initially bound to a first user account. In response to receiving this transaction request with this virtual account number, system 500 may process the transaction request using the second user account, rather than the first, as the access token's binding has already been switched away from the first user account to the second user account. As a result, the user may not need to update the access token details with the vendor. Thus, process 600 improves the user experience by enabling users to seamlessly transfer transactions from being processed with one user account to another without the need for contacting every vendor who possesses the access token details.

It is contemplated that the operations or descriptions of FIG. 6 may be used with any other embodiment of this disclosure. In addition, the operations and descriptions described in relation to FIG. 6 may be done in alternative orders or in parallel to further the purposes of this disclosure. For example, each of these operations may be performed in any order, in parallel, or simultaneously to reduce lag or increase the speed of the system or method. Furthermore, it should be noted that any of the components, devices, or equipment discussed in relation to the figures above could be used to perform one or more of the operations in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques for migrating access tokens that are used for validating network operations between user accounts will be better understood with reference to the following enumerated embodiments:

1. A method for moving access tokens for validating network operations between user accounts to prevent malicious or nonaligned usage, the method comprising: determining that a user is associated with a first user account and a second user account, wherein the first user account is associated with a plurality of access tokens, and wherein each access token is associated with a corresponding plurality of parameters and is used in processing network operation requests in relation to the first user account; retrieving a first plurality of parameters associated with the first user account and a second plurality of parameters associated with the second user account; determining, based on the first plurality of parameters matching the second plurality of parameters, that a first access token from the plurality of access tokens is available for migration from the first user account to the second user account; updating a binding associated with the first access token from the first user account to the second user account; and in response to receiving a network operation request associated with the first access token, processing the network operation request using the second user account.

2. The method of the preceding embodiment, wherein determining whether the first plurality of parameters matches the second plurality of parameters comprises: retrieving a plurality of transfer rules associated with the first user account; validating the second plurality of parameters associated with the second user account with the plurality of transfer rules; and in response to determining that validation is successful, determining that the first plurality of parameters matches the second plurality of parameters.

3. The method of any of the preceding embodiments, further comprising: inputting the first plurality of parameters, the second plurality of parameters, and metadata associated with the first user account into a machine learning model trained to determine whether to migrate access tokens between two user accounts; and receiving from the machine learning model a determination whether to migrate the first access token from the first user account to the second user account.

4. The method of any of the preceding embodiments, wherein determining whether the first plurality of parameters matches the second plurality of parameters further comprises: retrieving an expiration date parameter associated with the first user account; and based on determining that the expiration date parameter is not within a threshold time period, disabling an option to migrate the first access token.

5. The method of any of the preceding embodiments, wherein one or more parameters of the first plurality of parameters are inherited from the first user account.

6. The method of any of the preceding embodiments, wherein determining whether the first plurality of parameters matches the second plurality of parameters comprises: retrieving an interchange parameter associated with the second user account; validate the interchange parameter against one or more transfer rules; and in response to determining that validation is successful, determining that the first plurality of parameters matches the second plurality of parameters.

7. The method of any of the preceding embodiments, further comprising: detecting a creation of the second user account corresponding to the user; and in response to detecting the creation of the second user account, determining whether to migrate one or more access tokens from the first user account to the second user account.

8. The method of any of the preceding embodiments, further comprising: transmitting, to a user device, a command to display a plurality of options, wherein the command comprises a plurality of indications for the plurality of access tokens, and wherein the plurality of options enable the user to select the first access token to migrate to the second user account; and in response to receiving, from the user device, a selection of an option associated with the first access token, updating the binding associated with the first access token.

9. A tangible, non-transitory, machine-readable medium storing instructions that, when executed by a data processing apparatus, cause the data processing apparatus to perform operations comprising those of any of embodiments 1-8.

10. A system comprising one or more processors; and memory storing instructions that, when executed by the processors, cause the processors to effectuate operations comprising those of any of embodiments 1-8.

11. A system comprising means for performing any of embodiments 1-8.

12. A system comprising cloud-based circuitry for performing any of embodiments 1-8.

What is claimed is:

1. A system for moving a plurality of access tokens for validating network operations between user accounts to prevent malicious or nonaligned usage, the system comprising:
   one or more processors; and
   a non-transitory, computer-readable medium comprising instructions that when executed by the one or more processors cause operations comprising:
      detecting a creation of a new user account, of the user accounts, corresponding to a user;
      determining that the user is associated with an original user account, of the user accounts, having the plurality of access tokens, wherein each access token is associated with a corresponding plurality of parameters and is used in processing network operation requests in relation to the original user account, and wherein one or more parameters of the corresponding plurality of parameters are inherited from the original user account;
      determining to migrate one or more access tokens from the original user account to the new user account;
      retrieving a first plurality of parameters associated with the new user account and a second plurality of parameters associated with the original user account;
      determining, based on a transfer rule for allowing migration of access tokens and based on the first plurality of parameters matching the second plurality of parameters, that a first access token, from the plurality of access tokens, is available for migration from the original user account to the new user account;
      updating a binding associated for the first access token from the original user account to the new user account; and
      in response to receiving a network operation request associated with the first access token, processing the network operation request using the new user account instead of the original user account.

2. The system of claim 1, wherein the instructions for determining that the first access token is available for migration cause the one or more processors to perform operations comprising:
   retrieving a plurality of transfer rules associated with the original user account, wherein the plurality of transfer rules include the transfer rule;
   validating the second plurality of parameters associated with the new user account with the plurality of transfer rules; and
   in response to determining that validation is successful, determining that the first plurality of parameters matches the second plurality of parameters.

3. The system of claim 1, wherein the instructions further cause the one or more processors to perform operations comprising:
   inputting the first plurality of parameters, the second plurality of parameters, and metadata associated with the original user account into a machine learning model trained to determine whether to migrate a given access token between two user accounts; and
   receiving, from the machine learning model, a determination whether to migrate the first access token from the original user account to the new user account.

4. The system of claim 1, wherein the instructions further cause the one or more processors to perform operations comprising:
   retrieving an expiration date parameter associated with the original user account; and
   based on determining that the expiration date parameter is not within a threshold time period, disabling an option to migrate the first access token.

5. A method comprising:
   determining that a user is associated with a first user account and a second user account, wherein the first user account is associated with a plurality of access tokens, and wherein a first access token, of the plurality of access tokens, is associated with a corresponding plurality of parameters and is used in processing network operation requests in relation to the first user account;
   retrieving a first plurality of parameters associated with the first user account and a second plurality of parameters associated with the second user account;
   determining, based on a transfer rule for allowing migration of access tokens and based on the first plurality of parameters matching the second plurality of parameters, that the first access token is available for migration from the first user account to the second user account;
   updating a binding associated with the first access token from the first user account to the second user account; and
   in response to receiving a network operation request associated with the first access token, processing the network operation request using the second user account.

6. The method of claim 5, wherein determining that the first access token is available for migration comprises:
   retrieving a plurality of transfer rules associated with the first user account, wherein the plurality of transfer rules include the transfer rule;
   validating the second plurality of parameters associated with the second user account with the plurality of transfer rules; and in response to determining that validation is successful, determining that the first plurality of parameters matches the second plurality of parameters.

7. The method of claim 5, further comprising:
inputting the first plurality of parameters, the second plurality of parameters, and metadata associated with the first user account into a machine learning model trained to determine whether to migrate access tokens between two user accounts; and
receiving from the machine learning model a determination whether to migrate the first access token from the first user account to the second user account.

8. The method of claim 5, further comprising:
retrieving an expiration date parameter associated with the first user account; and
based on determining that the expiration date parameter is not within a threshold time period, disabling an option to migrate the first access token.

9. The method of claim 5, wherein one or more parameters of the first plurality of parameters are inherited from the first user account.

10. The method of claim 5, wherein determining that the first access token is available for migration comprises:
retrieving an interchange parameter associated with the second user account;
validating the interchange parameter against one or more transfer rules that include the transfer rule; and
in response to determining that validation is successful, determining that the first plurality of parameters matches the second plurality of parameters.

11. The method of claim 5, further comprising:
detecting a creation of the second user account corresponding to the user; and
in response to detecting the creation of the second user account, determining whether to migrate one or more access tokens from the first user account to the second user account.

12. The method of claim 5, further comprising:
transmitting, to a user device, a command to display a plurality of options, wherein the command comprises a plurality of indications for the plurality of access tokens, and wherein the plurality of options enable the user to select the first access token to migrate to the second user account; and
in response to receiving, from the user device, a selection of an option associated with the first access token, updating the binding associated with the first access token.

13. A non-transitory computer-readable medium storing instructions that, when executed by one or more processors, cause the one or more processors to perform operations comprising:
determining that a user is associated with a first user account and a second user account;
retrieving a first plurality of parameters associated with the first user account and a second plurality of parameters associated with the second user account;
determining, based on a transfer rule for allowing migration of access tokens and based on the first plurality of parameters matching the second plurality of parameters, that a first access token is available for migration from the first user account to the second user account;
updating a binding associated for the first access token from the first user account to the second user account; and
in response to receiving a network operation request associated with the first access token, processing the network operation request using the second user account.

14. The non-transitory computer-readable medium of claim 13, wherein the instructions for determining that the first access token is available for migration cause the one or more processors to perform operations comprising:
retrieving a plurality of transfer rules associated with the first user account, wherein the plurality of transfer rules include the transfer rule;
validating the second plurality of parameters associated with the second user account with the plurality of transfer rules; and
in response to determining that validation is successful, determine that the first plurality of parameters matches the second plurality of parameters.

15. The non-transitory computer-readable medium of claim 13, wherein the instructions further cause the one or more processors to perform operations comprising:
inputting the first plurality of parameters, the second plurality of parameters, and metadata associated with the first user account into a machine learning model trained to determine whether to migrate access tokens between two user accounts; and
receiving from the machine learning model a determination whether to migrate the first access token from the first user account to the second user account.

16. The non-transitory computer-readable medium of claim 13, wherein the instructions further cause the one or more processors to perform operations comprising:
retrieving an expiration date parameter associated with the first user account; and
based on determining that the expiration date parameter is not within a threshold time period, disabling an option to migrate the first access token.

17. The non-transitory computer-readable medium of claim 13, wherein one or more parameters of the first plurality of parameters are inherited from the first user account.

18. The non-transitory computer-readable medium of claim 13, wherein the instructions for determining that the first access token is available for migration cause the one or more processors to perform operations comprising:
retrieving an interchange parameter associated with the second user account;
validating the interchange parameter against one or more transfer rules that include the transfer rule; and
in response to determining that validation is successful, determining that the first plurality of parameters matches the second plurality of parameters.

19. The non-transitory computer-readable medium of claim 13, wherein the instructions further cause the one or more processors to perform operations comprising:
detecting a creation of the second user account corresponding to the user; and
in response to detecting the creation of the second user account, determining whether to migrate one or more access tokens from the first user account to the second user account.

20. The non-transitory computer-readable medium of claim 13, wherein the instructions further cause the one or more processors to perform operations comprising:
transmitting, to a user device, a command to display a plurality of options, wherein the command comprises a plurality of indications for a plurality of access tokens that include the first access token, and wherein the plurality of options enable the user to select the first access token to migrate to the second user account; and in response to receiving, from the user device, a selection of an option associated with the first access token, updating the binding associated for the first access token.

\* \* \* \* \*